(12) United States Patent
Bitz et al.

(10) Patent No.: US 7,047,821 B2
(45) Date of Patent: May 23, 2006

(54) MAGNETOINDUCTIVE FLOWMETER AND METHOD FOR PRODUCING A MEASURING TUBE FOR A MAGNETOINDUCTIVE FLOWMETER

(75) Inventors: Gunther Bitz, Mannheim (DE); Helmut Mayer, Wiesloch (DE); Ernst Arens, Moers (DE); Andreas Seidel, Voerde (DE); Udo Stevens, Euerbach (DE)

(73) Assignee: Friatec AG, Mannheim (DE)

( * ) Notice: Subject to any disclaimer, the term of this patent is extended or adjusted under 35 U.S.C. 154(b) by 0 days.

(21) Appl. No.: 11/178,975

(22) Filed: Jul. 11, 2005

(65) Prior Publication Data

US 2006/0010988 A1    Jan. 19, 2006

(30) Foreign Application Priority Data

Jul. 15, 2004   (DE) ..................... 10 2004 034 511
Jul. 26, 2004   (DE) ..................... 10 2004 036 192

(51) Int. Cl.
*G01F 1/58*       (2006.01)

(52) U.S. Cl. ................................ 73/861.12; 264/328.1

(58) Field of Classification Search ............. 73/861.08, 73/861.12, 861.27, 861.28, 861.29

See application file for complete search history.

(56) References Cited

U.S. PATENT DOCUMENTS

| 4,604,905 | A |   | 8/1986  | Rademacher-Dubbick |
| 5,247,837 | A | * | 9/1993  | Corpron .................. 73/861.12 |
| 5,544,532 | A | * | 8/1996  | Brown .................... 73/861.16 |
| 5,969,236 | A | * | 10/1999 | Hirota et al. ............. 73/61.75 |
| 6,588,262 | B1| * | 7/2003  | Kirzhner et al. ......... 73/119 A |

FOREIGN PATENT DOCUMENTS

| DE | 3344679    |   | 6/1985 |
| DE | 4335697    |   | 4/1995 |
| JP | 03289517 A |   | 12/1991 |

* cited by examiner

*Primary Examiner*—Edward Lefkowitz
*Assistant Examiner*—Corey D. Mack
(74) *Attorney, Agent, or Firm*—Cesari and McKena, LLP; John F. McKenna

(57) ABSTRACT

A magnetoinductive flowmeter encompasses a ceramic measuring tube as a conduit for a medium whose flow rate is to be measured, and a measuring electrode featuring a cermet body. The measuring tube is mounted in the wall of the measuring tube with its side that faces the medium conductively or capacitively connecting to the medium while its side facing away from the medium connects to a measuring line. The cross-sectional surface area of the cermet body is larger at its end facing the medium than at its other end facing away from the medium. The result is a measuring electrode that fully meets the respective requirements at either end notwithstanding minimized material consumption in making the electrode. A method for producing a measuring tube for the flowmeter is also disclosed.

8 Claims, 1 Drawing Sheet

MAGNETOINDUCTIVE FLOWMETER AND METHOD FOR PRODUCING A MEASURING TUBE FOR A MAGNETOINDUCTIVE FLOWMETER

BACKGROUND OF THE INVENTION

This invention relates to a magnetoinductive flowmeter with a ceramic measuring tube as a conduit for a medium whose flow rate is to be measured, and with a measuring electrode which measuring electrode, featuring a cermet body, is positioned in the wall of the measuring tube, its side facing the medium conductively or capacitively connected to the medium while its side facing away from the medium connects to a measuring line. The invention further relates to a method for producing a measuring tube for a magnetoinductive flowmeter.

Magnetoinductive flowmeters of the type referred to above have been well known for some time and are used in numerous different areas of application. The basic concept of a magnetoinductive flowmeter for flowing substances goes all the way back to Faraday who in 1832 introduced the idea of employing the electrodynamic induction principle for flow-rate measurements.

Faraday's law of induction postulates that when a flowing medium that contains charge carriers travels through a magnetic field, an electric field intensity is generated perpendicular to the direction of flow and perpendicular to the magnetic field. A magnetoinductive flowmeter applies Faraday's law in that a magnet, typically consisting of two magnetic poles, each with a field coil, generates a magnetic field perpendicular to the direction of flow in the measuring tube. Within this magnetic field, each volume element of the medium flowing through the magnetic field and containing a certain number of charge carriers contributes the field intensity generated in that volume element to a voltage potential that can be collected via the measuring electrodes.

The measuring electrodes are usually designed for conductive or capacitive inductive coupling to the flowing medium. On the side facing away from the medium they connect to a measuring line through which the collected electric potential can be fed to an evaluation device.

The use of cermet bodies for the measuring electrodes, which for the purpose of this description covers all electrodes that can be employed with the measuring tube of a magnetoinductive flowmeter, reference electrodes included, is common practice. The cermet body consists, for instance, of platinum as the metal and aluminum oxide as the ceramic component, with the ratio between the metal and the ceramic components as well as their commixture and the microstructure obtained thereby being so selected as to ultimately arrive at a conductive cermet body for the measuring electrode.

To date, cermet bodies for the measuring electrodes of a magnetoinductive flowmeter have been produced primarily by extruding a metal/ceramic mixture. Cutting the resulting extrusions into essentially pin-shaped bodies produces measuring electrodes that can be installed in the ceramic material of the measuring tube, for instance by press-fitting. This approach, however, has a number of drawbacks in that the process of cutting the cermet extrusion can result in breakage, and thus in the destruction of the measuring electrodes, involving considerable consumption of material, especially of the metal such as the expensive platinum.

SUMMARY OF THE INVENTION

It is, therefore, the objective of this invention to introduce a magnetoinductive flowmeter and a method for producing a measuring tube for a magnetoinductive flowmeter whereby, with a minimum amount of metal, a measuring electrode can be provided that is suitable for collecting a voltage induced in the medium and that permits easy and tight insertion in the wall of the ceramic measuring tube.

For a magnetoinductive flowmeter of the type described above, this objective is achieved by giving the cermet body a larger cross section at its end facing the medium than at its opposite end facing away from the medium.

The invention thus provides for a cermet body whose respective end diameters are precisely adapted to the local requirements. For the conductive or capacitive collection of a voltage induced in the medium, it is important for the cross-sectional surface of the measuring electrode not to be below a predefined minimum. Conversely, for electric conductivity and thus for connecting the measuring electrode to a measuring line a substantially smaller diameter will suffice. In other words, according to the invention the end of the cermet body facing the inside of the measuring tube has a larger diameter than does its other end.

In general, the diametric transition from one end of the cermet body to its other end is arbitrarily selectable. However, in a preferred embodiment of the invention, the diameter of the cermet body tapers off in continuous fashion from its end facing the medium toward its end facing away from the medium without increasing in size at any point along the way. This optimizes material savings by minimizing the consumption of an expensive metal such as platinum. Specifically, the cermet body can be in the form of a truncated cone or wedge, with the reduction to a very small diameter at the end of the cermet body facing away from the medium resulting in considerable material savings in comparison with prior-art pin-shaped cermet bodies.

Basically, the cross-sectional surface of the cermet body may be of any shape. However, in a preferred embodiment of the invention, the cross-sectional surface of the cermet body is in the form of a polygon. In a particularly preferred implementation of the invention, the cross-sectional surface of the cermet body facing the medium is quadrangular, preferably more or less rectangular and most preferably more or less square.

The cermet body of the measuring electrode may be mounted in the ceramic measuring tube in a variety of ways. In a preferred configuration of the invention, the cermet body is pressed into the ceramic measuring tube. In an alternative preferred embodiment of the invention the ceramic measuring electrode is injection-molded around the cermet body. This particular approach also allows for the cermet body to be injection-molded, in which case the measuring tube and the measuring electrode are produced jointly in a two-component injection-molding process.

In a preferred embodiment of the invention, the materials used for the cermet body are platinum as the metal component and aluminum oxide as the ceramic component, preferably at a ratio of about 30 to 70 by volume. Additionally, other metals and/or ceramic substances may also be admixed.

The ceramic measuring tube may be made from a variety of materials.

However, in a preferred implementation of the invention, the ceramic measuring tube consists of aluminum oxide and/or doped or undoped zirconium oxide or of mixtures of these components at any desired ratio.

Finally, a preferred embodiment of the invention is provided with two measuring electrodes, preferably opposite each other, and each with a cermet body as described above. The design may also include additional measuring electrodes, for instance a reference electrode, again with a cermet body as described above.

The inventive method for producing a measuring tube for a magnetoinductive flowmeter characteristically involves the following steps:

production of a cermet body for a measuring electrode by plastic shaping or by injection molding;

pressing the raw cermet body into a ceramic substance for producing the measuring tube in which the measuring electrode is incorporated.

Thus, the key point is that the cermet body for the measuring electrode is produced by plastic shaping or injection molding and can then be pressed into the ceramic material of the measuring tube of the magnetoinductive flowmeter without further processing, i.e. without any waste material. In connection with the press-fitting procedure, reference is made to EP 0 987 233 A1, the entire contents of which are hereby incorporated herein by reference.

An alternative inventive method for producing a measuring tube for a magnetoinductive flowmeter characteristically involves the following steps:

injection molding of a cermet body for a measuring electrode;

injection molding of a ceramic material around the raw cermet body for producing the measuring tube in which the measuring electrode is incorporated.

The alternative method according to the invention thus involves the aforementioned two-component injection-molding process in which the cermet body is injection-molded in its final form followed by the ceramic material being molded around it for producing the measuring tube in which the measuring electrode is incorporated.

As the key features of the two inventive methods described above, the cermet body for the measuring electrode can be produced directly by plastic shaping or injection molding in a manner whereby the cross-sectional surface of the cermet body is larger at one end than at its other end, resulting in the benefits already discussed above.

There are numerous ways in which the magnetoinductive flowmeter according to the invention as well as the inventive method for producing a measuring tube for a magnetoinductive flowmeter can be configured and enhanced. In that context, attention is invited to the dependent claims and to the following detailed description of a preferred embodiment of the invention with reference to the attached drawing.

DETAILED DESCRIPTION OF AN ILLUSTRATIVE EMBODIMENT

Figure 1:
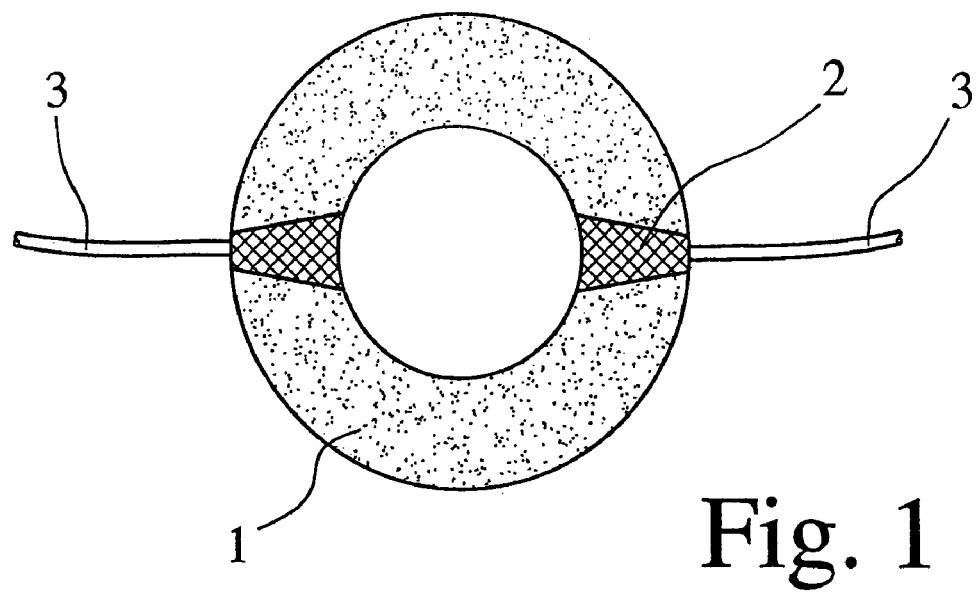
FIG. 1 is a cross section view, in the area of the electrodes, of a measuring tube for a magnetoinductive flowmeter according to a preferred embodiment of the invention.
Figure 2:
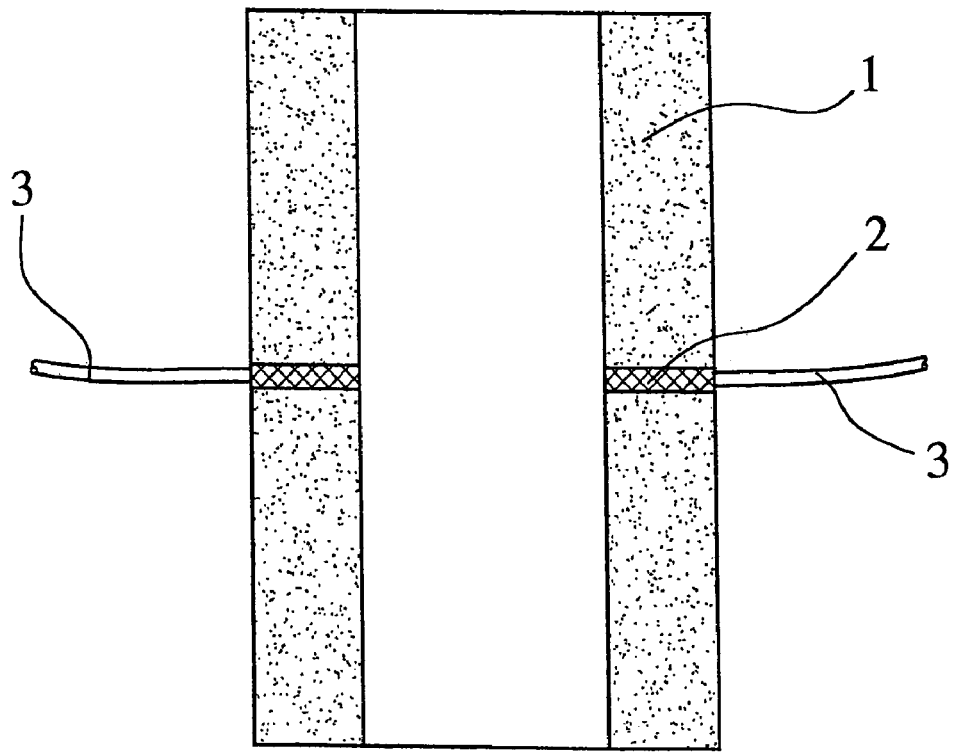
FIG. 2 is a longitudinal section view of the measuring tube according to the preferred implementation example of the invention.

As can be seen in the drawing figures, a magnetoinductive flowmeter incorporates a ceramic measuring tube 1 as the conduit for a medium whose flow rate is to be measured, and two measuring electrodes 2. The measuring electrodes 2 connect at their outer ends to measuring lines 3 through which the collected voltage potential can be fed to an evaluation device, not illustrated.

The measuring tube 1 consists of a ceramic material, in this case aluminum oxide. The measuring electrodes 2 are cermet bodies consisting of a mixture of about 30% by volume platinum and 70% by volume aluminum oxide. The shape of the cermet bodies serving as the measuring electrodes 2 is such that the cross-sectional surface of the cermet bodies is larger at their ends facing the medium and thus the interior of the measuring tube 1 than at their other ends. The drawing figures make this particularly clear by showing that the cermet bodies are of a flat shape which, when viewed from the top as in FIG. 1, is approximately trapezoidal. For a conductive collection, as in this case, of a voltage to be measured, the cross-sectional surface of the electrically conductive cermet body is large, whereas for connecting the measuring electrodes 2 to the measuring lines 3 a substantially smaller cross-sectional surface is sufficient.

The measuring tube according to the preferred embodiment of the invention is produced as follows. First, the powdered aluminum oxide and the platinum powder are premixed in their dry state at a ratio of about 70 to 30 by volume. After an organic binder is added, the material is homogenized by kneading. The kneaded mass is poured into the metering unit of an injection mold and the cermet bodies for the measuring electrodes 2 are molded first. Next, the ceramic material for the measuring tube 1 proper, in this case consisting of aluminum oxide, is molded in suitable fashion around the cermet bodies.

The significant advantage of the above-described two-component injection molding method lies in the fact that the cermet bodies for the measuring electrodes 2 can be produced directly in their final form, requiring no further processing of the cermet bodies and, in particular, by thus eliminating any material waste. Of course, as an alternative to the two-component injection molding method, it is possible to produce only the cermet bodies by injection molding or by some other plastic shaping or molding process and to then press the cermet bodies thus produced into the ceramic mass of the basic measuring tube 1.

What is claimed is:

1. A magnetoinductive flowmeter, with a ceramic measuring tube as a conduit for a medium whose flow rate is to be measured, and with a first measuring electrode, comprising a cermet body, mounted in the wall of the measuring tube so that its end that faces the medium conductively or capacitively connects to the medium while its end facing away from the medium connects to a measuring line, wherein the cermet body is injected molded and the measuring tube is injection molded around the cermet body such that the cermet body is incorporated into the measurmnn tube.

2. The magnetoinductive flowmeter as in claim 1, wherein the cermet body is a cross-sectional surface which is larger at said first end than at said second end.

3. The magnetoinductive flowmeter as in claim 2, wherein the cermet body has a diameter which continuously decreases from said first end toward said second end.

4. The magnetoinductive flowmeter as in claim 2 or 3, wherein the shape of said cross-sectional surface at said first end is polygonal.

5. The magnetoinductive flowmeter as in claim 1 or 2 wherein the cennet body comprises platinum and/or aluminum oxide.

6. The magnetoinductive flowmeter as in claim 1 or 2, wherein the ceramic measuring tube comprises aluminum oxide and/or doped or undoped zirconium oxide at a desired ratio.

7. The magnetoinductive flowmeter as in claim 1 or 2, and further including a second measuring electrode positioned opposite the first measuring tube, the second measuring tube comprising a second cermet body.

8. A magnetoinductive flowmeter for measuring the flow rate of a medium comprising
an injection molded cermat body having first and second ends and the final shape of a measuring electrode;
a ceramic measuring tube for conveying the medium, said measuring tube being injection molded around the cermat body so that said first end faces a medium conveyed by the measuring tube and said second end faces away from said medium whereby the measuring electrode is incorporated right into the measuring tube at the time of formation thereof.

* * * * *

UNITED STATES PATENT AND TRADEMARK OFFICE
CERTIFICATE OF CORRECTION

PATENT NO. : 7,047,821 B2
APPLICATION NO. : 11/178975
DATED : May 23, 2006
INVENTOR(S) : Gunther Bitz et al.

Page 1 of 1

It is certified that error appears in the above-identified patent and that said Letters Patent is hereby corrected as shown below:

On Title Page should read

Item (73) Assignee: Friatec AG, Mannheim (DE)
                             Krohne Messtechnik GmbH & Co. KG, Duisburg (DE)

Signed and Sealed this

Nineteenth Day of February, 2008

JON W. DUDAS
*Director of the United States Patent and Trademark Office*